United States Patent [19]

Enami et al.

[11] Patent Number: 5,174,221

[45] Date of Patent: Dec. 29, 1992

[54] MOUNT STRUCTURE FOR SHOCK-ABSORBER PADS OF FENDER

[75] Inventors: Yasushi Enami; Chuichi Ariyoshi, both of Chigasaki; Dan Nakamura, Yokohama, all of Japan

[73] Assignee: Bridgestone Corporation, Tokyo, Japan

[21] Appl. No.: 749,761

[22] Filed: Aug. 26, 1991

[30] Foreign Application Priority Data

Aug. 24, 1990 [JP] Japan .................................. 2-221219

[51] Int. Cl.$^5$ .............................................. B63B 59/02
[52] U.S. Cl. ...................................... 114/219; 405/215
[58] Field of Search ................ 114/219; 405/215, 212; 293/121; 267/140, 139, 153

[56] References Cited

U.S. PATENT DOCUMENTS

| | | | |
|---|---|---|---|
| 2,596,780 | 5/1952 | Meyers et al. | 267/140 |
| 3,225,731 | 12/1965 | McCulley | 114/219 |
| 3,600,896 | 8/1971 | Tateisi et al. | 114/219 |
| 4,319,539 | 3/1982 | Fujii et al. | 267/140 X |

*Primary Examiner*—Sherman Basinger
*Attorney, Agent, or Firm*—Sughrue, Mion, Zinn, Macpeak & Seas

[57] ABSTRACT

A shock-absorber pad mount structure for mounting shock-absorber pads made of elastic material such as polyethylene or the like to a tip end portion of a fender. The shock-absorber pad mount structure comprises a groove having a T-shaped cross-section, which is formed along the rear surface of the shock-absorber pad and consists of a base groove portion extending within the shock-absorber pad in parallel to the rear surface and a communicating groove portion extending from the central portion of the width of the base groove portion at right angles to the base groove portion and reaching the rear surface of the shock-absorber pad, a belt-like member having a width fittable into the base groove portion and fitted into the base groove portion, at least two bolts integrally studded to the central portion of the width of the belt-like member at a predetermined interval and projecting from the rear surface of the shock-absorber pad through the communicating groove portion of the T-shaped cross-section groove, a receiving member provided at the tip end portion of the fender and having bolt holes for allowing the bolts to penetrate therethrough, and nuts threadedly engaged with the tip ends of the bolts and fastened.

10 Claims, 7 Drawing Sheets

MOUNT STRUCTURE FOR SHOCK-ABSORBER PADS OF FENDER

BACKGROUND OF THE INVENTION

The present invention relates to a fender having a shock-absorber pad or pads made of elastic material such as polyethylene, nylon rubber, etc. mounted to its tip end portion. More particularly it relates to a mount structure of such shock-absorber pads to a fender.

FIG. 1 shows one example of a hollow cylindrical fender made of rubber in the prior art. Anchor bolts 03 are buried in a quay wall 01 to project from its side surface 02, a base end flange 04 of a fender 00 is fitted to these anchor bolts 03 and it is mounted to the side surface 02 by means of nuts 05. To a tip end flange 06 of the fender 00 is mounted a frame 07 composed of material such as section steel, and to the front surface of this frame 07 is preliminarily welded a steel plate 08. Shock-absorber pads made of synthetic resin having a relatively easily slidable property such as polyethylene, nylon and the like or pads made of soft rubber are brought into contact with the front surface of the steel plate 08. As shown in FIG. 2, bolts 011 are made to penetrate from recesses 010 in the shock-absorber pad 09 through the shock-absorber pad 09 and the steel plate 08 and project from the steel plate 08, and by threadedly engaging nuts 012 with these bolts 011 and fastening them, the shock-absorber pad 09 is fixed to the steel plate 08.

In the above-described fender in the prior art, under the condition where a ship is moored in the proximity of a quay, each time the hull of the ship comes into contact with the shock-absorber pad 09 made of synthetic resin, the front surface of this shock-absorber pad 09 will wear, and if this wearing proceeds and the shock-absorber pad 09 becomes thin, then the hull would come into contact with the head of the bolt 011, and inevitably it would be damaged.

In addition, since the recess 010 in the shock-absorber pad 09 necessitates a sufficient space for loosely receiving a wrench socket to be engaged with the head of the bolt 011, a contact surface area of the shock-absorber pad 09 with the hull is reduced, and so, wearing of the shock-absorber pad 09 is fast.

Furthermore, it is liable that accessories of the hull are caught by the recess 010 of the shock-absorber pad 09. Hence a large force in the direction parallel to the quay wall side surface 02 acts upon the fender main body 00 and the shock-absorber pad 09.

Still further, if the number of the recesses 010 per one shock-absorber pad 09 is reduced so that the contact surface area of the shock-absorber pad 09 may not be reduced as much as possible, then in the event that one bolt 011 has been damaged, a fixing force for that portion would be greatly reduced. Hence, damage of the shock-absorber pad 09 peeling off is apt to occur, and so, reliability is low.

SUMMARY OF THE INVENTION

The present invention improves the fender in the prior art as described above, and it overcomes the difficulties of the fender in the prior art.

A mount structure for shock-absorber pads of a fender according to the present invention comprises a groove having a T-shaped cross-section, which is formed along the rear surface of the shock-absorber pad and consists of a base groove portion extending within the shock-absorber pad in parallel to the rear surface and a communicating groove portion extending from the central portion of the width of the base groove portion at right angles to the base groove portion and reaching the rear surface of the shock-absorber pad, a belt-like member having a width fittable into the base groove portion of the T-shaped cross-section groove and fitted into the base groove portion, at least two bolts integrally studded to the central portion of the width of the belt-like member at a predetermined interval and projecting from the rear surface of the shock-absorber pad through the communicating groove portion of the T-shaped cross-section groove, a receiving member provided at the tip end portion of the fender and having bolt holes for allowing the bolts to penetrate therethrough, and nuts threadedly engaged with the tip ends of the bolts and fastened.

According to the present invention, since the front surface of the shock-absorber pad is formed flat, foreign matters adhered to the hull would not be caught. Hence, the fender and the shock-absorber pad would be hardly subjected to a force parallel to the front surface of the shock-absorber pad. Also, as the contact area of the shock-absorber pad is broad, the shock-absorber pad would be hardly worn.

Since the thickness of the belt-like member can be made thinner than the thickness of the bolt head, a wearing margin of the shock-absorber pad can be sufficiently maintained by making the thickness from the base groove portion of the T-shaped cross-section groove to the front surface of the shock-absorber pad thick.

As the shock-absorber pad is pressed against the receiving member linearly by the belt-like member, the shock-absorber pad can be firmly fixed to the receiving member. Moreover, even if one of the plurality of bolts should be broken, the shock-absorber pad would not separate from the receiving member.

DETAILED DESCRIPTION OF THE PREFERRED EMBODIMENTS

Figure 1:
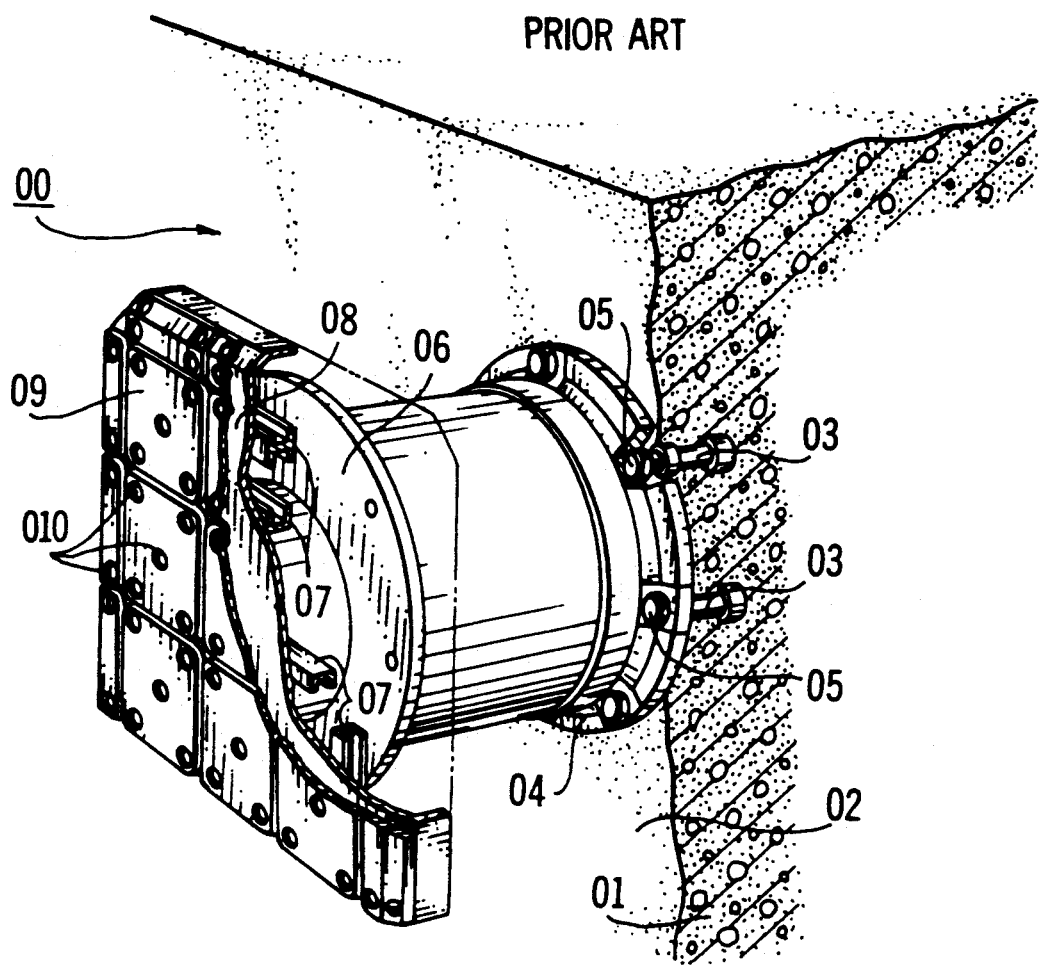
FIG. 1 is a perspective view partly cut away of a fender in the prior art.

In the following, a description will be made of one preferred embodiment of the present invention illustrated in FIGS. 3 and 4.

A fender 1 made of rubber consists of a fender main body 10 of hollow cylindrical shape having a base end flange 11 and a tip end flange 12 integrally formed at its opposite ends.

In a side surface 3 of a quay wall 2 are buried anchor bolts 4 in a relative arrangement identical to that of bolt holes 13 in the base end flange 11. The fender 1 is mounted to the quay wall 2 by fitting the bolt holes 13 in the base end flange 11 to the tip ends of anchor bolts 4 and threadedly engaging nuts 5 with the tip ends of the anchor bolts 4 to be fastened.

A frame main body 14 formed by making channels, H sections, and the like cross with one another in the vertical and horizontal directions, is integrally mounted to the tip end flange 12 by means of bolts not shown penetrating through the bolt holes 13 in the tip end flange 12 of the fender 1 and nuts threadedly engaged with the bolts. On the front surface of this frame main body 14 is preliminarily integrally stretched a front plate 15 made of steel, and in this steel front plate 15 are drilled bolt holes 16 at fixed intervals as aligned in the vertical direction and in the horizontal direction. It is to be noted that the frame main body 14 and the steel front plate 15 jointly corresponds to the receiving member.

Four shock-absorber pads 17 made of polyethylene and having a width equal to about ¼ of the horizontal dimension of the steel front plate 15 and a length nearly identical to the vertical dimension of the steel front plate 15, are prepared, and upon extrusion molding of the shock-absorber pad 17. As shown in FIG. 4, in the rear surface of this shock-absorber pad 17 is formed with two T-shaped cross-section grooves 20 in parallel to each other, each consisting of a base groove portion 21 parallel to the rear surface 18 and a communicating groove portion 22 extending from the center of the width of the base groove portion 21 up to the rear surface 18. The communicating groove portion 22 is designed to align with the column in the vertical direction of the bolt holes 16 in the steel front plate 15.

At the center in the widthwise direction of the rear surface 24 of the belt-like member 23, formed in a size enough to be fitted in the base groove portion 21 of the T-shaped cross-section groove, are integrally fixed, as by welding, bolts 25 at the same interval as the interval in the vertical direction of the above-described bolt holds 16, as directed in the perpendicular direction.

Figure 2:
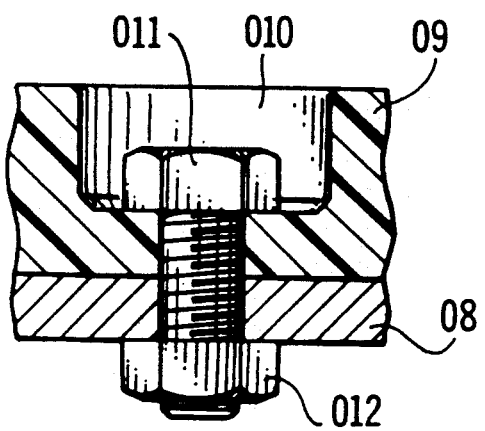
FIG. 2 is a cross-section view of an essential part of the same fender.
Figure 3:
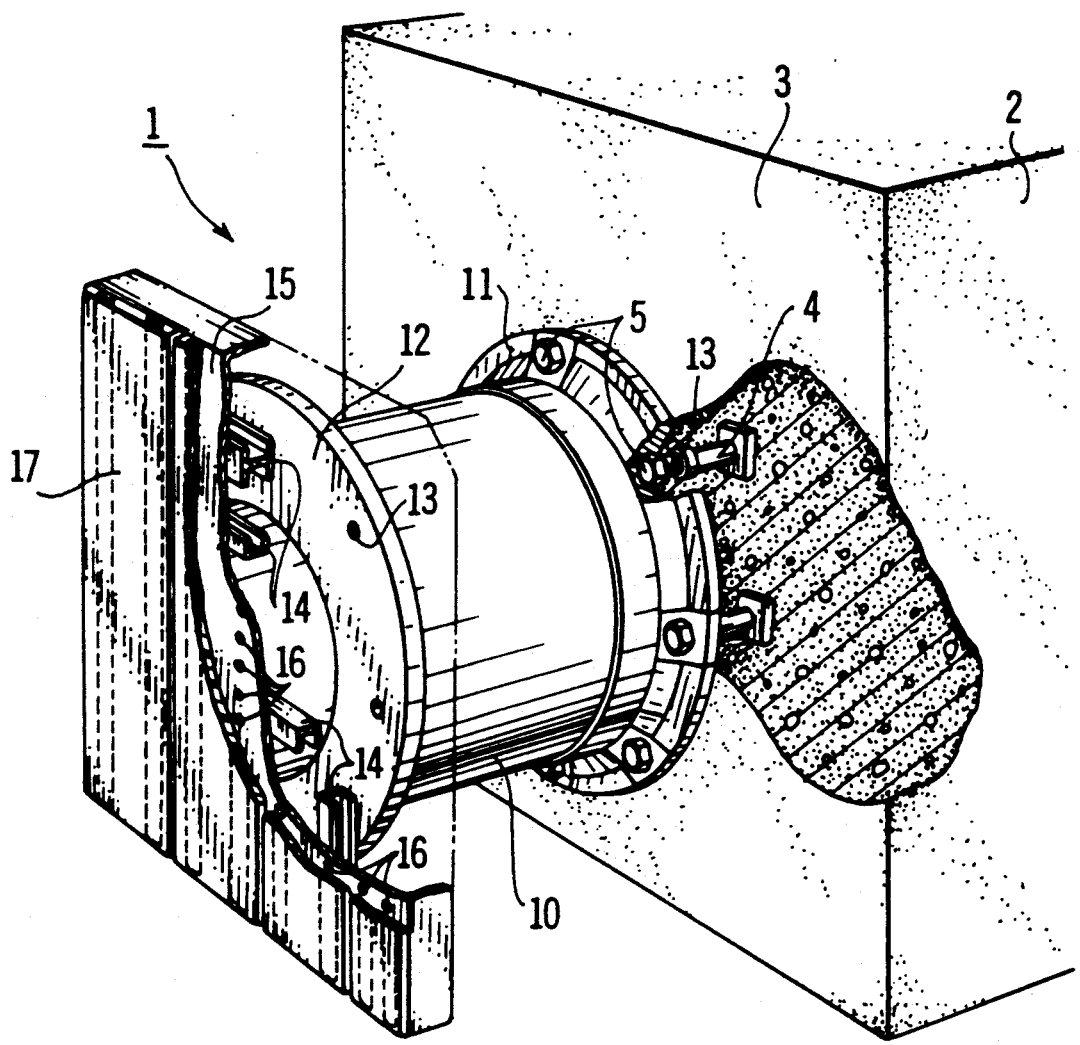
FIG. 3 is a perspective view partly cut away showing one preferred embodiment of a mount structure for shock-absorber of a fender according to the present invention.

Since the preferred embodiment illustrated in FIGS. 2 and 3 is formed in the above-described manner, when one end of the belt-like member 23 is fitted in the base groove portion 21 of the T-shaped cross-section groove 20 with the bolts 25 on the belt-like member 23 directed to the near surface 18 of the shock-absorber pad 17 and the belt-like member 23 is inserted along the lengthwise direction of the T-shaped cross-section groove 20, the belt-like member 23 is mounted as fitted in the base groove portion 21 of the T-shaped cross-section groove 20 under the condition that the bolts 25 project from the communicating groove portion 22 of the T-shaped cross-section groove 20 to the outside of the rear surface 18 of the shock-absorber pad 18.

The shock-absorber pads 17 having the belt-like member 23 mounted thereto in the above described manner are conveyed to the proximity of the steel front plate 15 of the fender 1. The bolts 25 projecting from the rear surfaces 18 of the shock-absorber pad 17 are fitted in the bolt holes of the steel front plate 15. When nuts, not shown, are threadedly engaged with the tip ends of the bolts 25 projecting from the rear surface of the steel front plate 15 and fastened, the shock-absorber pads 17 can be mounted to the front surface of the steel front plate 15 of the fender 1.

As the front surfaces of the shock-absorber pads 17 mounted to the front surface of the steel front plate 15 of the fender 1 are formed flat, when the hull has come into contact with the front surfaces of the shock-absorber pads 17, foreign matter adhered to the ship or accessories of the hull would not be caught by the shock-absorber pads 17. The shock-absorber pads 17 and the fender main body 10 would not therefore be subjected to a large force in the direction parallel to the front surfaces of the shock-absorber pads 17. Accordingly the shock-absorber pads 17 would be hardly peeled off, and also a durability of the fender main body 10 would not be deteriorated.

Since the thickness of the belt-like member 23 can be made thinner than the thickness of the bolt head in the heretofore known fender, a wearing margin of the shock-absorber pad 17 can be maintained sufficiently by making the thickness from the base groove portion 21 of the T-shaped cross-section groove 20 up to the front surface of the shock-absorber pad 17 thick. Moreover, it becomes unnecessary to form recesses on the front surface of the shock-absorber pad 17 and the contact area of the shock-absorber pad 17 can be broadened. The shock-absorber pad 17 will be hardly worn, and as a result, durability of the shock-absorber pad 17 can be improved.

Since bolts 25 are provided in two columns along the respective sides of the rear surface of the shock-absorber pad 17, the shock absorber pad 17 can be firmly mounted and secured to the steel front plate 15. Moreover, even if one bolt 25 should be broken, as a fixing force in the neighborhood of the broken bolt can be maintained owing to the belt-like member 23, the shock-absorber pad 17 would not be peeled off and damaged, and reliability of the fender is improved.

Furthermore, while a fixing force was generated by pressing the shock-absorber pad against the receiving member through the sum of the areas of washers pinched between the shock-absorber pad and the bolt heads in the heretofore known fender, in the above-described preferred embodiment, since a fixing is generated by pressing the shock-absorber pad 17 against the steel front plate 15 through the belt-like member 23 having a far broader area than the sum of the areas of the above-mentioned washers, the shock-absorber pad 17 can be firmly fixed to the steel front plate 15.

Figure 4:
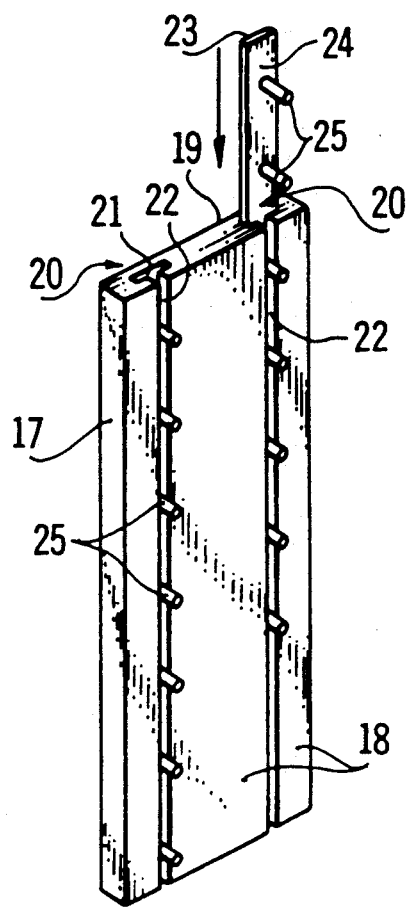
FIG. 4 is a perspective view of a shock-absorber pad and a belt-like memmber in the same preferred embodiment.
Figure 5:
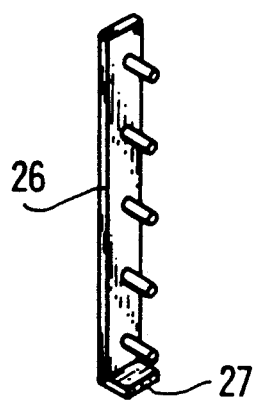
FIG. 5 is a perspective view of a belt-like member according to another preferred embodiment.

While the belt-like member 23 was flat in shape in the preferred embodiment illustrated in FIGS. 3 and 4, a modification could be made such that the bottom portion of a belt-like member 26 is bent, at a right angle, to the projecting side of the bolts 25 to from a bent stopper 27. The top end of the belt-like member 26 inserted into the base groove portion 21 of the T-shaped cross-section groove 20 in the shock-absorber pad 17 from its bottom end. In this modified embodiment, upon mounting the shock-absorber pad 17 to the steel front plate 15, slip-off of the shock-absorber pad 17 can be prevented by making the bent stopper 27 of the belt-like member 26 support the shock-absorber pad 17. Thus, mounting work of the shock-absorber pads 17 can be performed easily.

Figure 6:
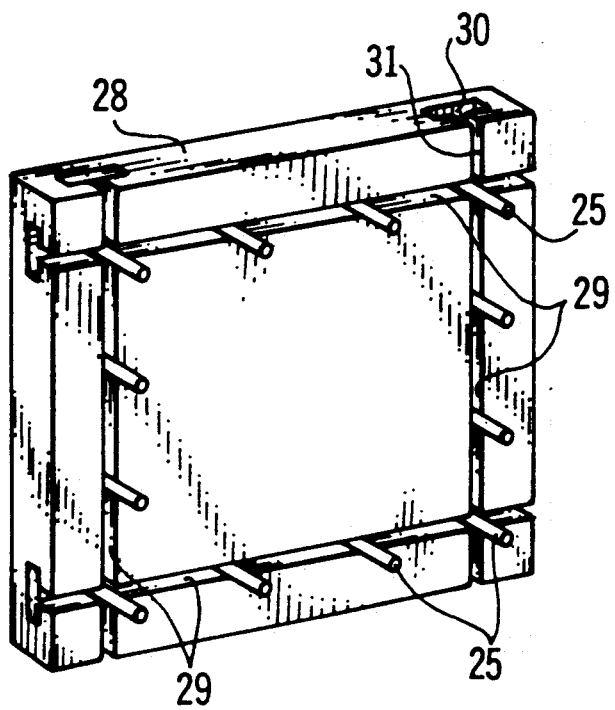
FIG. 6 is a perspective view showing still another preferred embodiment.
Figure 7:
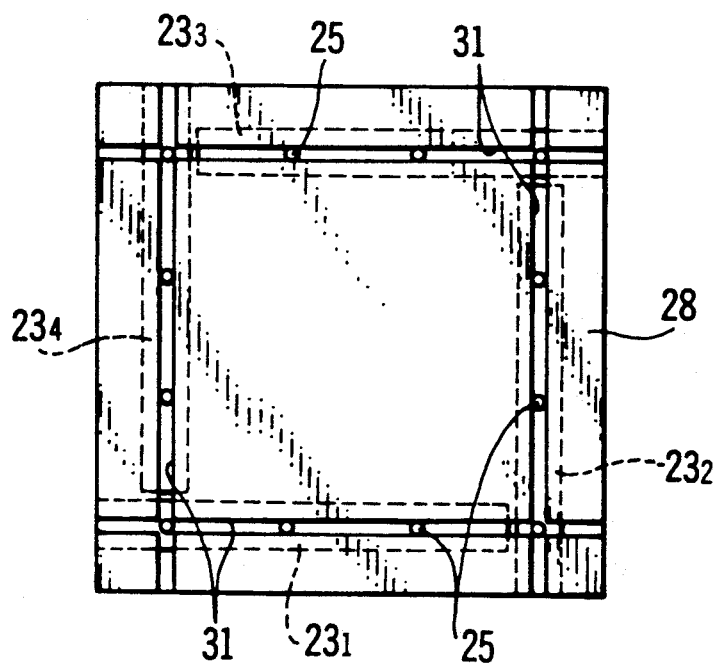
FIG. 7 is a front view of the same preferred embodiment.

As shown is FIGS. 6 and 7, T-shaped cross-section grooves 29 could be formed in a pattern of projected parallels within a single shock-absorber pad 28 having nearly the same area as the steel front plate 15 of the fender 1. Each T-shaped cross-section groove 29 consists of a base groove portion 30 and a communicating groove portion 31, and bolts 25 on the belt-like members $23_1$, $23_2$, $23_3$, and $23_4$ (FIG. 7) inserted into the respective base groove portions 30 project through the communicating groove portions 31. The belt-like members are respectively inserted into the corresponding base grobve portions 30 successively in the sequence of $23_1$, $23_2$, $23_3$, and $23_4$ in the anticlockwise direction as viewed in FIG. 7. In this preferred embodiment, since the shock-absorber pad 28 is one pad, workability for mounting of the shock-absorber pad is improved.

Figure 8:
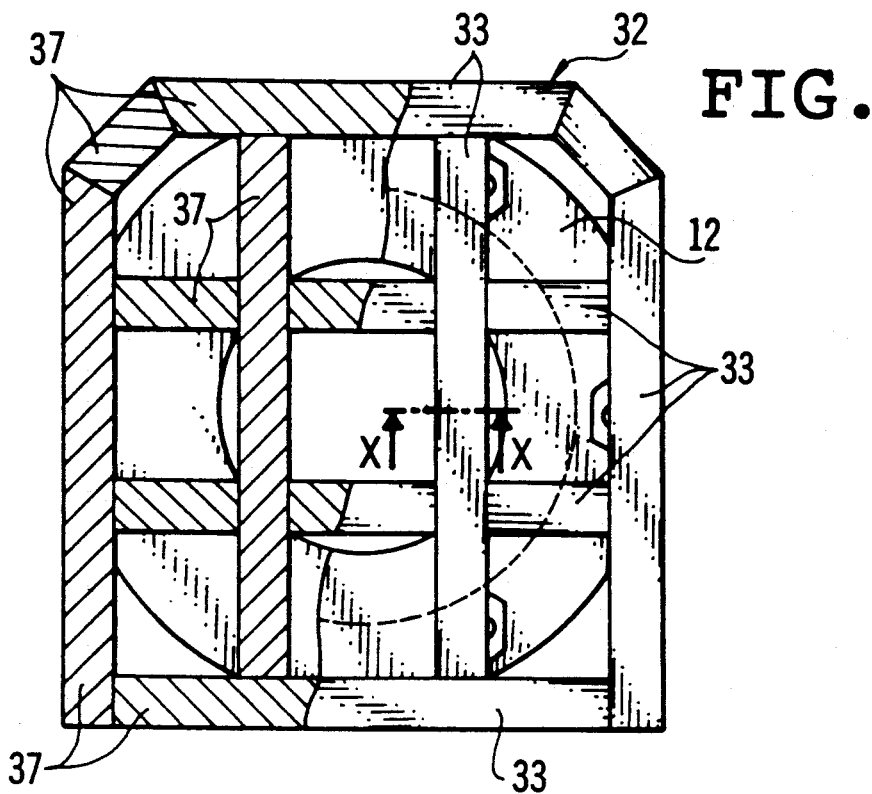
FIG. 8 is a front view showing a still further preferred embodiment.
Figure 9:
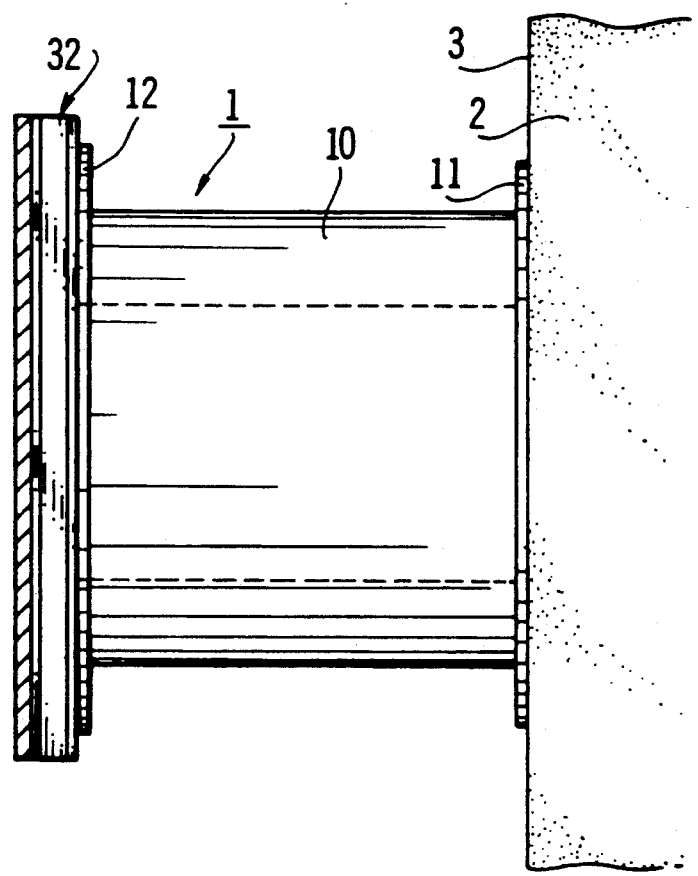
FIG. 9 is a side view of the same preferred embodiment.
Figure 10:
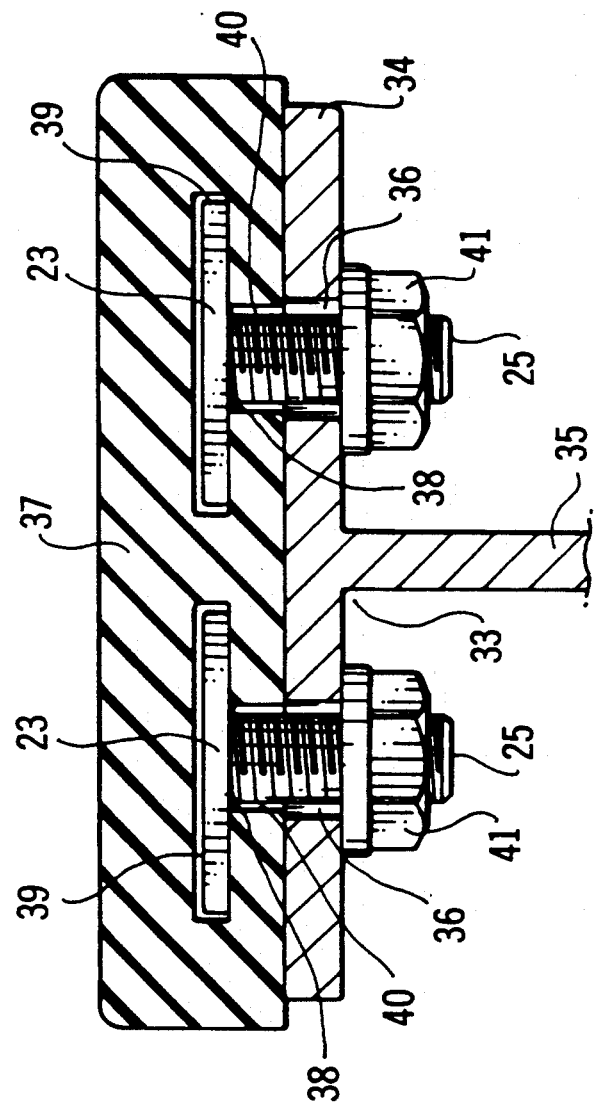
FIG. 10 is a transverse cross-section view taken along line X—X in line in FIG. 8.

In another preferred embodiment of the present invention illustrated in FIGS. 8 to 10, a frame main body 32 of the shape of a square having its two upper corners obliquely cut away is formed by assembling H sections 33 in a pattern of projected parallels. In a front side flange 34 of each H section 33 are formed bolt holes 36 on the respective sides of a web 35 as aligned in one column at a predetermined interval. In a shock-absorber pad 37 having a width nearly equal to that of the flange 34 of the H section 33 are formed two T-shaped cross-section grooves 38 each consisting of a base groove portion 39 and a communicating groove portion 40 at an interval nearly equal to the interval of the columns of the bolt holes 36. In the respective base groove portions 39 are respectively inserted and mounted belt-like members 23 which are similar to the above-described belt-like members. The bolts of the belt-like member 23 penetrate through the bolt holes 36, and by threadedly engaging nuts 41 with the tip ends of the bolts and fastening the nuts, the shock-absorber pad 37 is mounted to the H section 33 of the frame main body 32.

Figure 11:
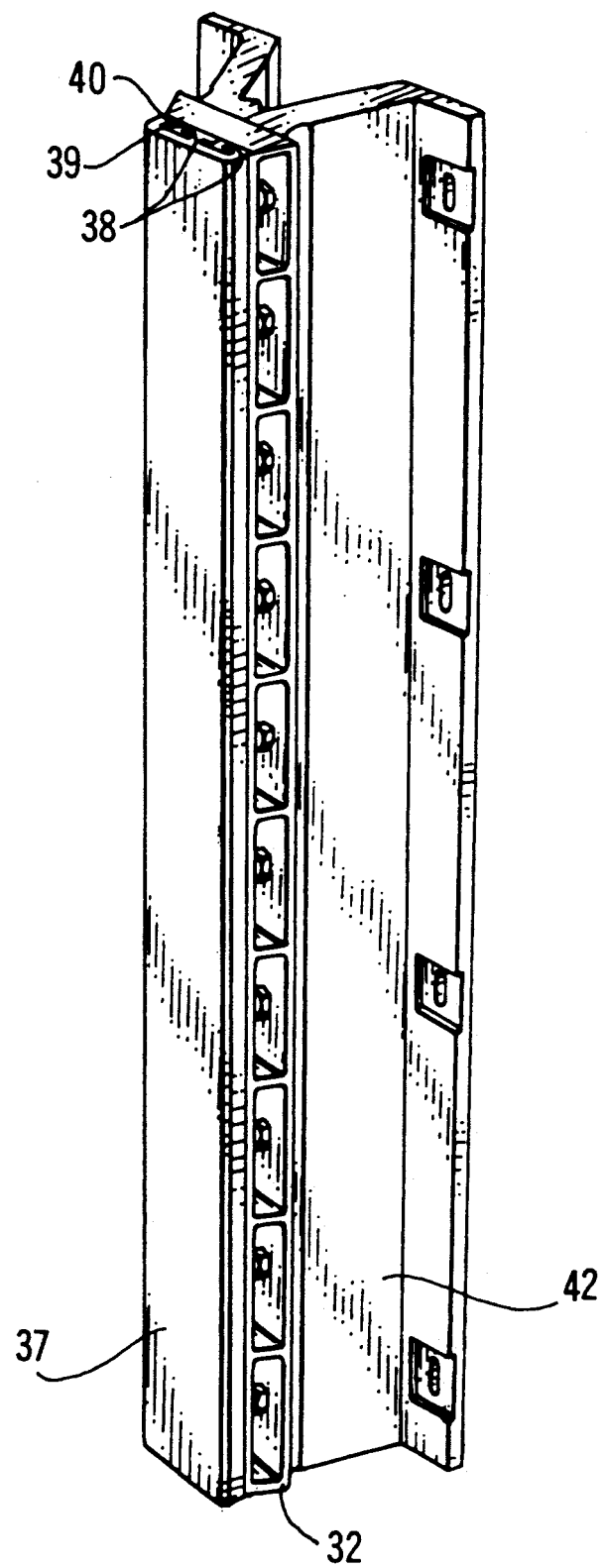
FIG. 11 is a perspective view showing yet another preferred embodiment.

FIG. 11 shows yet another preferred embodiment, in which the present invention is applied to an elongated fender 42 having a trapezoidal cross-section, and component parts corresponding to those of the above-described preferred embodiments are given reference numerals similar to those in FIGS. 8 to 10.

What is claimed is:

1. A shock-absorber pad mount structure for mounting shock-absorber pads made of an elastic material to a tip end portion of a fender, said mount structure comprising; a groove having a T-shaped cross-section, which is formed along a rear surface of said shock-absorber pad, said groove fruther comprising a base groove portion extending within said shock-absorber pad in parallel to said rear surface, a communicating groove portion extending from a central portion of the width of said base groove portion at right angles to said base groove portion and reaching the rear surface of said shock-absrober pad, a belt-like member having a width fittable into said base groove portion and fitted into said base groove portion of said T-shaped cross-section groove, at least two bolts integrally 5 studded to a central portion of the width of said belt-like member at a predetermined integral and projecting from the rear surface of said shock-absorber pad through the communicating groove portion of said T-shaped cross-section groove, a receiving member provided at the tip end portion of said fender and having bolt holes for allowing said bolts to penetrate therethrough, and nuts threadedly engaged with the tip ends of said bolts and fastened;

said receiving member comprising a frame main body fixedly secured to a tip end flange portion of the fender, and a steel front plate fixedly secured to said frame main body;

a plurality of said shock-absorber pads mounted and aligned in a widthwise direction of said steel front plate, each of said shock-absorber pads having a length substantially equal to a dimension in a direction perpendicular to said widthwise direction of said steel front plate and said T-shaped crosssection groove extended lengthwise of the shock-absorber pad.

2. A shock-absorber pad mount structure as claimed in claim 1, fruther comprising a second T-shaped cross-section groove extending lengthwise of the shock-absrober pad and formed in parallel to said T-shaped cross-section groove along the rear surface of each said shock-absrober pad.

3. A shock-absrober pad mount structure as claimed in claim 1, wherein an end of said belt-like member is bent at right angles to form a bent stopper.

4. A shock-absorber pad mount structure as claimed in claim 1, wherein said elastic material is polyethylene.

5. A shock-absorber pad mount structure for mounting shock-absorber pads made of elastic material to a tip end portion of a fender, said mount structure comprising; grooves having a T-shaped cross-section, which is formed along arear surface of said shock-absorber pad, said grooves fruther comprising a base groove portion extending within said shock-absrober pad in parallel to said rear surface, a communicating groove portion extending from a central portion of the width of said base groove portion at right angles to said base groove portion and reaching the rear surface of said shock-absorber pad, a belt-like member having a width fittable into said base groove portion and fitted into said base groove portion of each of said T-shaped cross-section grooves, at least two bolts integrally studded to a central portion of the wedth of said belt-like member at a predetermined interval and projecting from the rear surface of said shock-absrober pad through the communicating groove portion of each of said T-shaped cross-section grooves, a receiving member provided at the tip end portion of said fender and having bolt holes for allowing said bolts to penetrate therethrough, and nuts threadedly engaged with the tip ends of said bolts and fastened;

said receiving member comprising a frame main body fixedly secured to a tip end flange portion of the fender, and a steel front plate fixedly secured to said frame main body; and said T-shaped cross-section grooves are formed in a parallel pattern in one said shock-absorber pad having a substantially identical area to said steel front plate.

6. A shock-absorber pad mount structure as claimed in claim 5, wherein said elastic material is polyethylene.

7. A shock-absorber pad mount structure for mounting shock-absorber pads made of elastic material to a tip end portion of a fender; said mount structure comprising a groove having a T-shaped cross-section, which is formed along the rear surface of said shock-absorber pad, said groove fruther comprising a base groove portion extending within said shock-absorber pad in parallel to said rear surface, a communicating groove portion extending from a central portion of the width of said base groove portion at right angles to said base groove portion and reaching the rear surface of said shock-absrober pad, a belt-like member having a width fittable into said base groove portion and fitted into said base groove portion of said T-shaped cross-section groove, at least two bolts integrally studded to a central portion of the width of said belt-like member at predetermined interval and projection from the rear surface of said shock-absrober pad through the communicating groove portion of said T-shaped cross-section groove, a receiving member provided at the tip end portion of said fender and having bolt holes for allowing said bolts to penetrate therethrough, and nuts threadedly engaged with the tip ends of said bolts and fastened;

said receiving member comprising H sections mounted to a surface of the tip end portion of the fender in a pattern of projected parallels with flange portions of said H sections in parallel to said tip end surface, and front flange portions of the respective H sections having mounted thereon shock-absorber pads having a width substantially equal to that of said flange portion.

8. A shock-absorber pad mount structure as claimed in claim 7, wherein said shock-absorber pad is provided with said T-shaped cross-section grooves one on each of respective sides of a web portion of said H section.

9. A shock-absrober pad mount structure as claimed in claim 7, wherein said elastic material is polyethylene.

10. A shock-absorber pad mount structure for mounting shock-absorber ads made of elastic material to a tip end portion of a fender which is an elongated body having a trapedzoidal cross-section; said mount structure comprising a groove having a T-shaped cross-section, which is formed along the rear surface of said shock-absorber pad, said groove comprising a base groove portion extending within said shock-absorber pad in parallel to said rear surface, a communicating roove portion extending from a central portion of the width of said base groove portion at right angles to said base groove portion and reaching the rear surface of said shock-absorber pad, a belt-like member having a width fittable into said base groove portion and fitted into said base groove portion of said T-shaped crosssection groove, at least two bolts integrally studded to a central portion of the width of said belt-like member at a predeermined interval and projecting from the rear surface of said shock-absrober pad through the communicating groove portion of said T-shaped cross-section groove, a receiving member provided at the tip end portion of said fender and having bolt holes for allowing said bolts to penetrate therethrough, and nuts threadedly engaged with the tip ends of said bolts and fastened;

said receiving member comprising a H section mounted to a surface of the tip end portion of the fender with flange portions of said H section in parallel to said tip end surface, and a front flange portion of said H section having mopujted thereon said shock-absorber pad hving a width enarly equal to that of sid flange portion;

said shock-absorber pad being provided with said T-shaped cross-section grooves one on each of respective sides of a web portion of said H section.

* * * * *